United States Patent
O'Leary

(10) Patent No.: US 8,897,956 B2
(45) Date of Patent: Nov. 25, 2014

(54) DUAL LEARN WINDOWS FOR BRAKE PEDAL RELEASED POSITION

(71) Applicant: GM Global Technology Operations LLC, Detroit, MI (US)

(72) Inventor: Patrick J. O'Leary, Clinton Township, MI (US)

(73) Assignee: GM Global Technology Operations LLC

( * ) Notice: Subject to any disclaimer, the term of this patent is extended or adjusted under 35 U.S.C. 154(b) by 99 days.

(21) Appl. No.: 13/680,563

(22) Filed: Nov. 19, 2012

(65) Prior Publication Data

US 2014/0142813 A1    May 22, 2014

(51) Int. Cl.
*G06F 11/30*    (2006.01)

(52) U.S. Cl.
CPC .................................... *G06F 11/30* (2013.01)
USPC ............................................ 701/34.4; 701/70

(58) Field of Classification Search
CPC .. B60T 17/22; B60T 17/221; B60W 2540/12; B60W 50/0205
USPC .................................. 701/29.1, 29.2, 34.4, 70
See application file for complete search history.

(56) References Cited

U.S. PATENT DOCUMENTS

| | | | | |
|---|---|---|---|---|
| 5,150,681 A | * | 9/1992 | Kull et al. | 123/399 |
| 2009/0012670 A1 | * | 1/2009 | Gruenter | 701/29 |
| 2010/0188203 A1 | * | 7/2010 | Wallace et al. | 340/454 |
| 2011/0196597 A1 | * | 8/2011 | Stempnik et al. | 701/115 |

* cited by examiner

*Primary Examiner* — Thomas Tarcza
*Assistant Examiner* — Kevin Myhre

(57) ABSTRACT

A system includes a pedal position sensor that senses a pedal position of a vehicle pedal when the vehicle pedal is in a known position. The system also includes a learn window determination module that selects between a first pedal position range and a second pedal position range that corresponds to the known position. The system further includes a pedal fault determination module that determines a fault in the vehicle pedal based on the pedal position and the selected one of the first pedal position range and the second pedal position range.

18 Claims, 3 Drawing Sheets

DUAL LEARN WINDOWS FOR BRAKE PEDAL RELEASED POSITION

FIELD

The present disclosure relates to vehicle assembly plant learn windows and more specifically to vehicle brake pedal position learn windows.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles, including, but not limited to, hybrid engine vehicles, may include a pedal assembly (e.g., a brake pedal assembly) and a pedal position sensor arranged to sense a position of the vehicle pedal. The pedal position may be used to determine whether or not the vehicle pedal is operating within a predetermined tolerance. Further, the pedal position may be used to determine whether to actuate a vehicle accessory (e.g., a vehicle light).

SUMMARY

A system includes a pedal position sensor that senses a pedal position of a vehicle pedal when the vehicle pedal is in a known position. The system also includes a learn window determination module that selects between a first pedal position range and a second pedal position range that corresponds to the known position. The system further includes a pedal fault determination module that determines a fault in the vehicle pedal based on the pedal position and the selected one of the first pedal position range and the second pedal position range.

In other features, a method includes sensing a pedal position of a vehicle when the vehicle pedal is in a known position. The method also includes selecting between a first pedal position range and a second pedal position range that corresponds to the known position. The method further includes, determining a fault in the vehicle pedal based on the pedal position and the selected one of the first pedal position range and the second pedal position range.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Vehicles, including, but not limited to, hybrid engine vehicles, may include a brake pedal assembly (e.g., including a brake pedal) and a brake pedal position sensor arranged to sense a position of the brake pedal when the brake pedal is in a known pedal position. For example, the known pedal position may correspond to the brake pedal being in a released position. The brake pedal position may be used to determine whether or not the brake pedal is operating within a predetermined tolerance. For example, the brake pedal position may be verified to be less than an upper threshold and greater than a lower threshold for a corresponding known pedal position.

The predetermined tolerance may vary based on the known pedal position and the location of the brake assembly. For example, the location of the brake assembly may correspond to the brake assembly being in an assembly plant. When the vehicle is in the assembly plant, the brake pedal assembly is subject to fewer conditions that may cause wear or corrosion than when after the vehicle is sold and used by a driver. When the vehicle is driven, heat, friction, moisture, and other conditions may cause the brake assembly to wear, resulting in greater variance in the brake pedal position. While the vehicle is in the assembly plant, fewer forces are acting on the brake assembly to cause wear or corrosion, resulting in less variance in the brake pedal position. Accordingly, the predetermined tolerance is lower when the vehicle is in the assembly plant and the predetermined tolerance is greater after the vehicle is sold and used by the driver.

Figure 1:
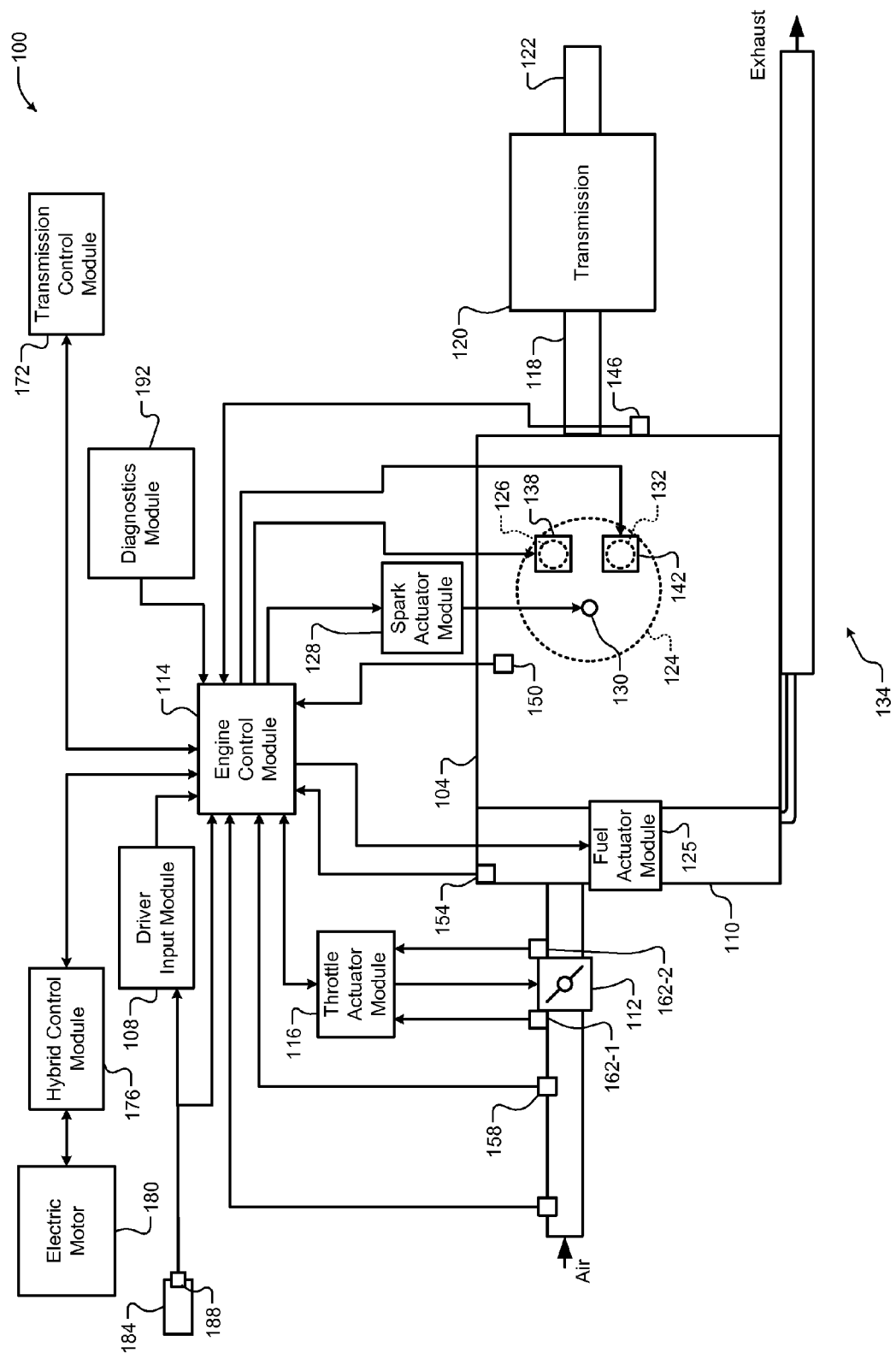
FIG. 1 is a schematic illustration of an engine system according to the present disclosure.

Referring now to FIG. 1, a functional block diagram of an example engine system 100 is presented. The engine system 100 includes an engine 104 that combusts an air/fuel mixture to produce drive torque for a vehicle based on driver input from a driver input module 108.

Air may be drawn into an intake manifold 110 through a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control the amount of air drawn into the intake manifold 110. A torque converter 118 transfers and multiplies torque from the engine 104 and provides the torque to a transmission 120. The transmission 120 operates in one or more gear ratios to transfer the torque to a driveline 122.

Air from the intake manifold 110 is drawn into cylinders of the engine 104. While the engine 104 may include more than one cylinder, for illustration purposes a single representative cylinder 124 is shown. The engine 104 may operate using a four-stroke cycle. The four strokes, described below, may be named the intake stroke, the compression stroke, the combustion stroke, and the exhaust stroke. During each revolution of a crankshaft (not shown), two of the four strokes occur within the cylinder 124. Therefore, two crankshaft revolutions are necessary for the cylinder 124 to experience all four of the strokes.

During the intake stroke, air from the intake manifold 110 is drawn into the cylinder 124 through an intake valve 126. The ECM 114 controls a fuel actuator module 125, which regulates fuel injection to achieve a desired air/fuel ratio. Fuel may be injected into the intake manifold 110 at a central location or at multiple locations, such as near the intake valve 126 of each of the cylinders. In various implementations (not shown), fuel may be injected directly into the cylinders or into mixing chambers associated with the cylinders.

The injected fuel mixes with air and creates an air/fuel mixture in the cylinder 124. During the compression stroke, a piston (not shown) within the cylinder 124 compresses the air/fuel mixture. The engine 104 may be a compression-ignition engine, in which case compression in the cylinder 124 ignites the air/fuel mixture. Alternatively, the engine 104 may be a spark-ignition engine, in which case a spark actuator module 128 energizes a spark plug 130 in the cylinder 124 based on a signal from the ECM 114, which ignites the air/fuel mixture. The timing of the spark may be specified relative to the time when the piston is at its topmost position, referred to as top dead center (TDC).

The spark actuator module 128 may be controlled by a timing signal specifying how far before or after TDC to generate the spark. Because piston position is directly related to crankshaft rotation, operation of the spark actuator module 128 may be synchronized with crankshaft angle.

Generating spark may be referred to as a firing event. The spark actuator module 128 may have the ability to vary the timing of the spark for each firing event. The spark actuator module 128 may even be capable of varying the spark timing for a next firing event when the spark timing is changed between a last firing event and the next firing event.

During the combustion stroke, the combustion of the air/fuel mixture drives the piston away from TDC, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through one or more exhaust valves, such as exhaust valve 132. The byproducts of combustion are exhausted from the vehicle via an exhaust system 134.

An intake valve actuator 138 controls actuation of the intake valve 126. An exhaust valve actuator 142 controls actuation of the exhaust valve 132. The intake and exhaust valve actuators 138 and 142 control opening and closing of the intake and exhaust valves 126 and 132, respectively, without one or more camshafts. The intake and exhaust valve actuators 138 and 142 may include, for example, electo-hydraulic actuators, electro-mechanical actuators, or another suitable type of camless valve actuator. Camless intake and exhaust valve actuators enable actuation of each intake valve and exhaust valve of the engine to be controlled independently. The intake and exhaust valve actuators provide what may be referred to as fully flexible valve actuation (FFVA).

Position of the crankshaft may be measured using a crankshaft position sensor 146. Engine speed, engine acceleration, and/or one or more other parameters may be determined based on the crankshaft position. A temperature of the engine coolant may be measured using an engine coolant temperature (ECT) sensor 150. The ECT sensor 150 may be located within the engine 104 or at other locations where the coolant is circulated, such as a radiator (not shown).

A pressure within the intake manifold 110 may be measured using a manifold absolute pressure (MAP) sensor 154. In various implementations, engine vacuum, which is the difference between ambient air pressure and the pressure within the intake manifold 110, may be measured. A mass flowrate of air flowing into the intake manifold 110 may be measured using a mass air flowrate (MAF) sensor 158. In various implementations, the MAF sensor 158 may be located in a housing that also includes the throttle valve 112.

The throttle actuator module 116 may monitor position of the throttle valve 112 using one or more throttle position sensors (TPS) 162. For example, first and second throttle position sensors 162-1 and 162-2 monitor position of the throttle valve 112 and generate first and second throttle positions (TPS1 and TPS2), respectively, based on the throttle position. A temperature of air being drawn into the engine 104 may be measured using an intake air temperature (IAT) sensor 166. The ECM 114 may use signals from the sensors and/or one or more other sensors to make control decisions for the engine system 100.

A transmission control module 172 may control operation of the transmission 120. The ECM 114 may communicate with the transmission control module 172 for various reasons, such as to share parameters and to coordinate engine operation with operation of the transmission 120. For example, the ECM 114 may selectively reduce engine torque during a gear shift. The ECM 114 may communicate with a hybrid control module 176 to coordinate operation of the engine 104 and an electric motor 180.

The electric motor 180 may also function as a generator and may be used to produce electrical energy for use by vehicle electrical systems and/or for storage in a battery. The electric motor 180 may also function as a motor and may be used, for example, to supplement or replace engine torque output. In various implementations, various functions of the ECM 114, the transmission control module 172, and the hybrid control module 176 may be integrated into one or more modules.

Each system that varies an engine parameter may be referred to as an actuator. Each actuator receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 128 may be referred to as an actuator, while the corresponding actuator value may be the amount of spark advance relative to cylinder TDC. Other actuators may include the fuel actuator module 125. For these actuators, the actuator values may correspond to a number of activated cylinders, fueling rate, intake and exhaust valve timing, boost pressure, and EGR valve opening area, respectively. The ECM 114 may control actuator values in order to cause the engine 104 to generate a desired engine output torque.

The engine system 100 also includes a pedal 184 and a pedal position sensor 188. The pedal 184 may be a brake pedal or an accelerator pedal. In other words, the pedal 184 corresponds to a driver input device arranged to receive an instruction from a driver of the vehicle. For example, the driver may actuate the pedal 184 to activate a brake of the vehicle. The pedal position sensor 188 senses a pedal position of the pedal 184 when the pedal 184 is in a known pedal position and communicates the pedal position to the driver input module 108. For example, the known pedal position may corresponds to a released position of the pedal 184. The driver input module 108 communicates the pedal position to the ECM 114. The ECM 114 selectively controls a plurality of the vehicle accessories based on the pedal position. For example, the ECM 114 may illuminate a brake light of the vehicle based on the pedal position.

In another example, the pedal position sensor 188 may communicate directly with the ECM 114. For example, the pedal position sensor 188 may sense a pedal position when the pedal 184 is in the known pedal position. The pedal position sensor 188 communicates the pedal position to the ECM 114. The ECM 114 determines whether the pedal position is within a predetermined pedal range. The predetermined pedal range includes an upper threshold and a lower threshold. The upper threshold and the lower threshold are determined based on the known pedal position. The ECM 114 may actuate a warning indicator when the pedal position is not within the predetermined pedal range. The warning indicator may include, but is not limited to, a dashboard light or a message displayed on a screen within the vehicle.

When the ECM 114 determines that the pedal position is within the predetermined pedal range, the ECM 114 stores the pedal position in a lookup table. The ECM 114 may then monitor a plurality of pedal positions and determine when one of the plurality of pedal positions is equal to the stored pedal position. When the ECM 114 determines one of the plurality of pedal positions is equal to the stored pedal position, the ECM 114 may then actuate a vehicle accessory. For example, when the ECM 114 determines one of the plurality of pedal positions is equal to the stored pedal position, the ECM 114 deactivates a vehicle brake light.

The engine system 100 may also include a diagnostic module 192. The diagnostic module 192 is arranged to receive a diagnostic mode signal. The diagnostic mode signal is indicative of whether the vehicle is an assembly plant. While the vehicle is located at the assembly plant, the ECM 114 may conduct a plurality of assembly plant diagnostics on the vehicle. The plurality of assembly plant diagnostics may include testing parts installed while the vehicle was at the assembly plant. For example, the plurality of assembly plant diagnostics includes determining whether a position of the pedal 184 is within a predetermined range. The diagnostic module 192 may receive the diagnostic mode signal from an external device electrically coupled to the diagnostic module 192.

The diagnostic module 192 communicates the diagnostic mode signal to the ECM 114. The ECM 114 determines whether the vehicle is in an assembly plant based on the diagnostic mode signal. The ECM 114 conducts the plurality of assembly plant diagnostics on the vehicle. Similarly, when the ECM 114 determines the vehicle is not in an assembly plant based on the diagnostic mode signal, the ECM 114 conducts a plurality of post assembly diagnostics on the vehicle. The plurality of post assembly diagnostics may include testing parts of the vehicle after the vehicle has been sold and is in use by a driver. The ECM 114, the diagnostic module 192, and the pedal position sensor 188 together may implement a pedal fault determination system.

Figure 2:
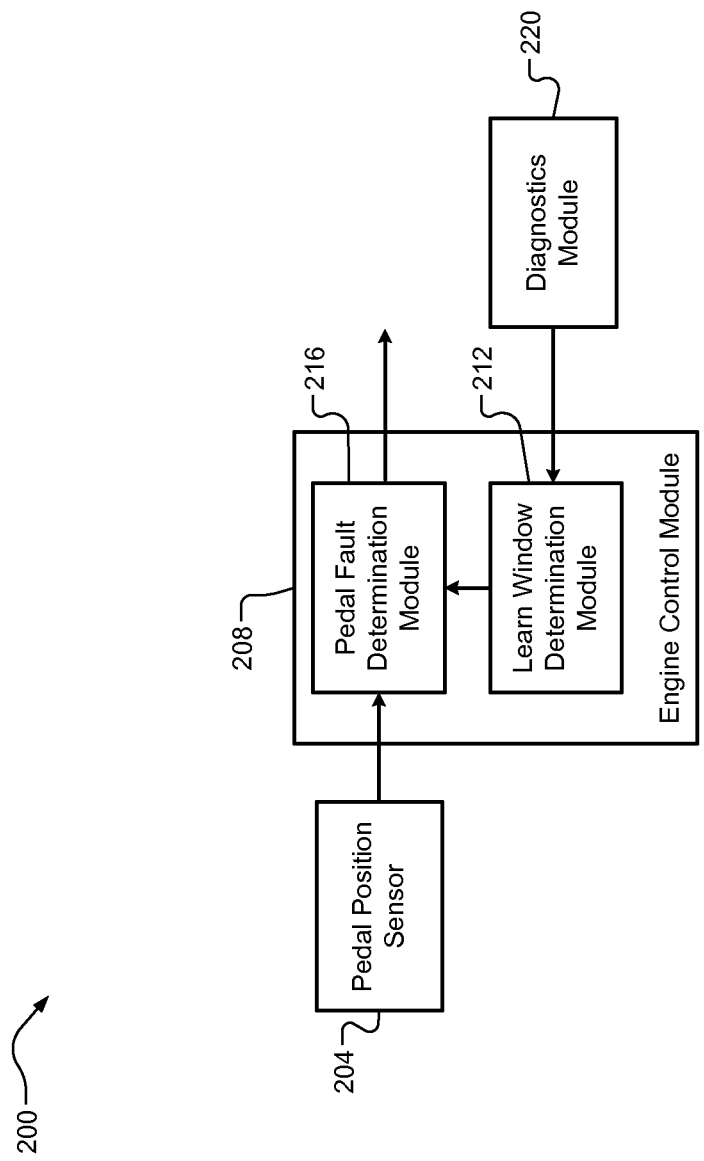
FIG. 2 is a schematic illustration of a pedal fault determination system according to the present disclosure.

Referring now to FIG. 2, a pedal fault determination system 200 is shown. The pedal fault determination system 200 includes a pedal position sensor 204 and an engine control module (ECM) 208. The ECM 208 includes a learn window determination module 212 and a pedal fault determination module 216. The pedal position sensor 204 senses a position of the pedal 184 when the pedal 184 is in a known pedal position. For example, the known pedal position corresponds to a released pedal position or an engaged position of the pedal 184. A force is applied by an operator in order to actuate the pedal 184. When the applied force is greater than a predetermined threshold, the pedal 184 is in the engaged position. Conversely, when the applied force is less than a predetermined threshold, the pedal 184 is in the released position. The pedal position sensor 204 senses an engaged position of the pedal 184 when the pedal 184 is in the engaged position and communicates the engaged position to the drive input module 108. The pedal position sensor 204 senses a release position of the pedal 184 when the pedal 184 is in the release position and communicates the released position to the driver input module 108 and pedal fault determination module 216.

The learn window determination module 212 determines a location of the vehicle and selectively adjusts a pedal learn window. For example, the vehicle may be located in an assembly plant, a vehicle maintenance shop, a vehicle dealership, or on a public road operated by a driver of the vehicle. The pedal fault determination system 200 may also include a diagnostic module 220. The diagnostic module 220 may be either arranged within the vehicle or arranged as an external module. The learn window determination module 216 receives a diagnostic mode signal from the diagnostic module 220. The diagnostic mode signal is indicative of a location of the vehicle. The learn window determination module 212 determines whether the vehicle is in an assembly plant based on the diagnostic mode signal. When learn window determination module 212 determines the vehicle is in an assembly plant, the learn window determination module 212 selectively adjusts a pedal learn window. The pedal learn window is a predetermined range including an upper threshold and a lower threshold.

For example, when the learn window determination module 212 determines the vehicle is in the assembly plant, the learn window determination module 212 adjusts the pedal learn window to include a first upper threshold and a first lower threshold. Conversely, when the learn window determination module 212 determines the vehicle is not in the assembly plant, the learn window determination module 212 adjusts the pedal learn window to include a second upper threshold and a second lower threshold. The first upper threshold may be less than the second upper threshold and the first lower threshold may be greater than the second lower threshold. For example, the first upper threshold and the first lower threshold may be arranged to verify that a pedal position of the pedal 184 is within a first tolerance while the vehicle is in the assembly plant.

The second upper threshold and the second lower threshold may be arranged to verify that a pedal position of the pedal 184 is within a second tolerance after the vehicle has been sold and is operated by a driver. The first tolerance may be less than the second tolerance due to expected wear on the pedal 184 after the vehicle is sold and driven by the driver. For example, heat, friction, moisture, and other factors contribute to wear on the pedal 184 after the vehicle is driven. The learn window determination module 212 communicates the pedal learn window to the pedal fault determination module 216.

The pedal fault determination module 216 determines whether a fault has occurred in a pedal based on the pedal position and the pedal learn window. For example, the pedal fault determination module 216 determines whether a fault has occurred in the pedal 184. The pedal fault determination module 216 receives a pedal position and a pedal learn window. The pedal position may be indicative of a released position of the pedal 184. The pedal learn window includes an upper threshold and a lower threshold. For example, the upper threshold may be the first upper threshold and the lower threshold may be the first lower threshold. The pedal fault determination module 216 determines a fault has occurred in the pedal 184 when the pedal position is greater than the upper threshold. Similarly, the pedal fault determination module 216 determines a fault has occurred in the pedal 184 when the pedal position is less than the lower threshold. The pedal fault determination module 216 actuates a pedal warning indicator when the pedal fault determination module 216 determines a fault has occurred in the pedal 184. The pedal warning indicator may be a dashboard light indicating to the operator that a fault has occurred in the pedal 184.

The pedal fault determination module 216 may also update a stored value indicative of a pedal position of the pedal 184. For example, the pedal fault determination module 216 receives the pedal position and the pedal learn window. The pedal position may be indicative of a released position of the pedal 184 or an engaged position of the pedal 184. The pedal learn window includes an upper threshold and a lower threshold. The pedal fault determination module 216 determines a fault has not occurred in the pedal 184 when the pedal position is less than the upper threshold and the pedal position is greater than the lower threshold. When the pedal fault determination module 216 determines that a fault has not occurred in the pedal 184, the pedal fault determination module 216 stores the pedal position in a look-up table.

The ECM 208 may monitor a plurality of pedal positions. The ECM 208 then determines when one of the plurality of pedal positions is equal to the stored pedal position. The ECM 208 may then actuate a vehicle accessory. For example, when the ECM 208 determines one of the plurality of pedal positions is equal to the stored pedal position, the ECM 208 may actuate a brake of the vehicle.

Figure 3:
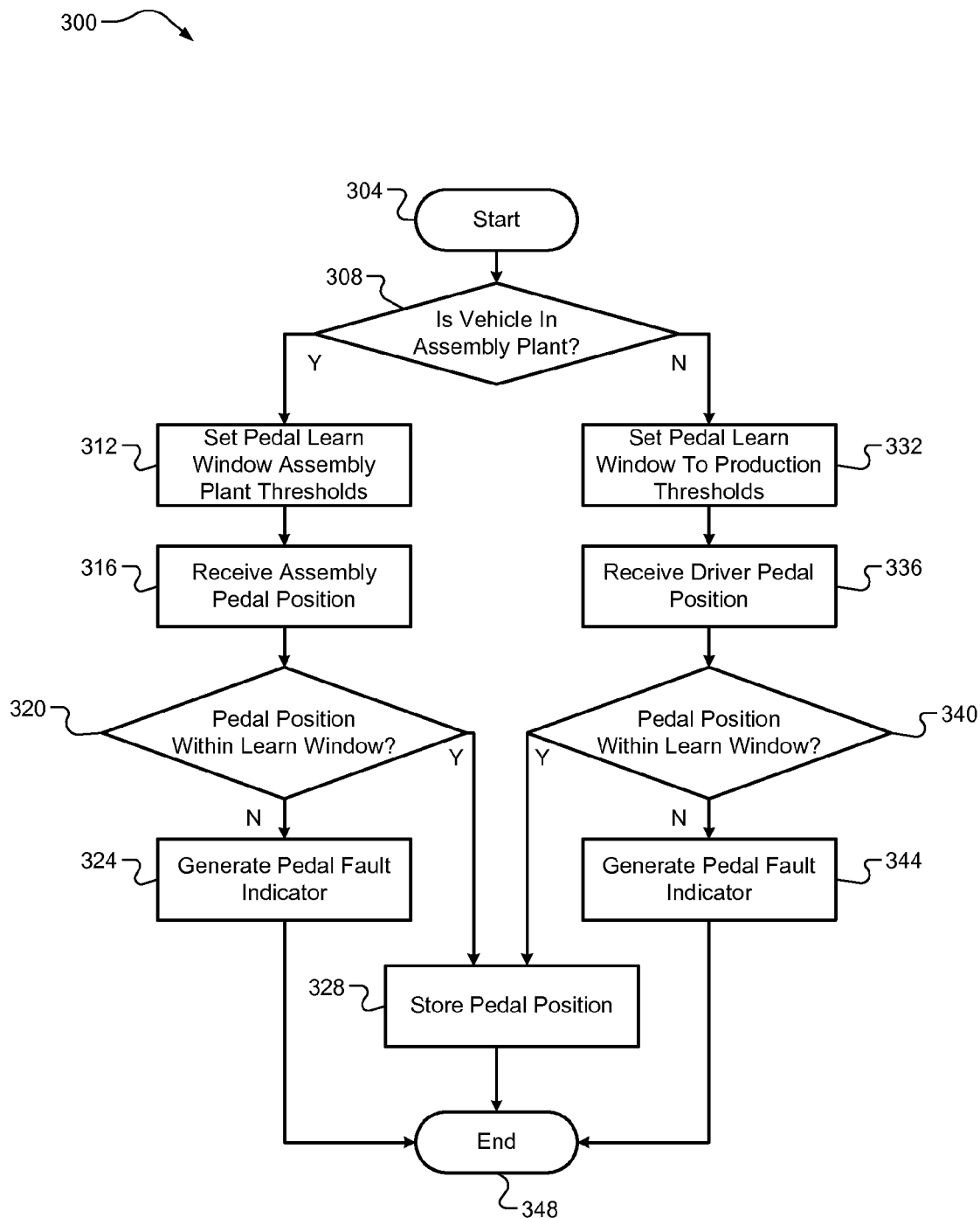
FIG. 3 is a flow diagram illustrating a pedal fault determination method according to the present disclosure.

Referring now to FIG. 3, a pedal fault determination method 300 begins at 304. At 308, the method 300 determines whether a vehicle is located in an assembly plant. If false, the method 300 continues at 332. If true, the method 300 continues at 312. At 312, the method 300 sets a pedal learn window to include a first upper threshold and a first lower threshold. At 316, the method 300 receives an assembly plant pedal position. At 320, the method 300 determines whether the assembly plant pedal position is within the pedal learn window. If true, the method 300 continues at 328. If false, the method 300 continues at 324. At 324, the method 300 generates a pedal fault indicator. At 328, the method 300 stores the pedal position. At 332, the method 300 sets a pedal learn window to include a second upper threshold and a second lower threshold. At 336, the method 300 receives a driver pedal position. At 340, the method 300 determines whether the driver pedal position is within the pedal learn window. If true, the method continues at 328. If false, the method 300 continues at 344. At 344, the method 300 generates a pedal fault indicator. The method 300 ends at 348.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A system comprising:
a pedal position sensor that senses a pedal position of a vehicle pedal when the vehicle pedal is in a known position;
an engine control module that selects between a first pedal position range and a second pedal position range based on a location of the engine control module and that determines a fault in the vehicle pedal based on the pedal position and the selected one of the first pedal position range and the second pedal position range.

2. The system of claim 1 wherein the engine control module determines a fault in the vehicle pedal when the pedal position is not within the selected one of the first pedal position range and the second pedal position range.

3. The system of claim 1 wherein the engine control module determines no fault in the vehicle pedal when the pedal position is within the selected one of the first pedal position range and the second pedal position range.

4. The system of claim 1 wherein the first pedal position range includes a first upper threshold and a first lower threshold and the second pedal position range includes a second upper threshold and a second lower threshold.

5. The system of claim 4 wherein the first upper threshold is less than the second upper threshold and the first lower threshold is greater than the second lower threshold.

6. The system of claim 1 wherein the engine control module stores the pedal position in a pedal position lookup table.

7. The system of claim 6 wherein the engine control module receives a plurality of sensed pedal positions and that selectively controls a plurality of vehicle accessories based on at least one of the plurality of sensed pedal positions.

8. The system of claim 7 wherein the plurality of vehicle accessories includes a vehicle brake light.

9. The system of claim 8 wherein the engine control module deactivates the vehicle brake light when the at least one of the plurality of sensed pedal positions equals the pedal position.

10. A method comprising:
using an electronic circuit:
sensing a pedal position of a vehicle pedal when the vehicle pedal is in a known position;
selecting between a first pedal position range and a second pedal position range based on a location of the vehicle pedal; and
determining a fault in the vehicle pedal based on the pedal position and the selected one of the first pedal position range and the second pedal position range.

11. The method of claim 10 further comprising determining a fault in the vehicle pedal when the pedal position is not within the selected one of the first pedal position range and the second pedal position range.

12. The method of claim 10 further comprising determining no fault in the vehicle pedal when the pedal position is within the selected one of the first pedal position range and the second pedal position range.

13. The method of claim 10 further comprising the first pedal position range includes a first upper threshold and a first lower threshold and the second pedal position range includes a second upper threshold and a second lower threshold.

14. The method of claim 13 wherein the first upper threshold is less than the second upper threshold and the first lower threshold is greater than the second lower threshold.

15. The method of claim 10 further comprising storing the pedal position in a pedal position lookup table.

16. The method of claim 15 further comprising receiving a plurality of sensed pedal positions and selectively controlling a plurality of vehicle accessories based on at least one of the plurality of sensed pedal positions.

17. The method of claim 16 wherein the plurality of vehicle accessories includes a vehicle brake light.

18. The method of claim 17 further comprising deactivating the vehicle brake light when the at least one of the plurality of sensed pedal positions equals the pedal position.

\* \* \* \* \*